Nov. 17, 1953

H. E. WILLOCK 2,659,446

REAR-END SUSPENSION FOR MOTOR TRUCKS

Filed April 23, 1951

INVENTOR
HARRY EDWARD WILLOCK

Ernest E Carter
ATTORNEY

Patented Nov. 17, 1953

2,659,446

UNITED STATES PATENT OFFICE 2,659,446

REAR-END SUSPENSION FOR MOTOR TRUCKS

Harry Edward Willock, Vancouver, British Columbia, Canada

Application April 23, 1951, Serial No. 222,427

2 Claims. (Cl. 180—22)

My invention relates to improvements in rear end suspension for motor trucks.

The objects of the invention are primarily to provide a truck having a normal driven rear axle and two rear wheels, with a closely fitted trailing axle and a further pair of wheels, whereby heavy loads can be carried on four rear wheels and light loads carried upon two such wheels. To provide that the trailing axle and its wheels may be retracted from ground contact when the load is such that it can be safely carried on the driven axle. And in case of a load, being carried upon driven and trailing axles, on a hill when traction is faulty, that the weight of the load may be transferred from the trailing axle to the original rear axle of the truck until traction is restored. To provide that the transfer of the load from one to both axles may be done by the operator at any time with the vehicle travelling or at rest, and to provide that the wheels of the trailing axle may be raised and supported completely out of ground contact.

Referring to the drawings.

In the drawings like characters of reference indicate corresponding parts in each figure.

Figure 1:
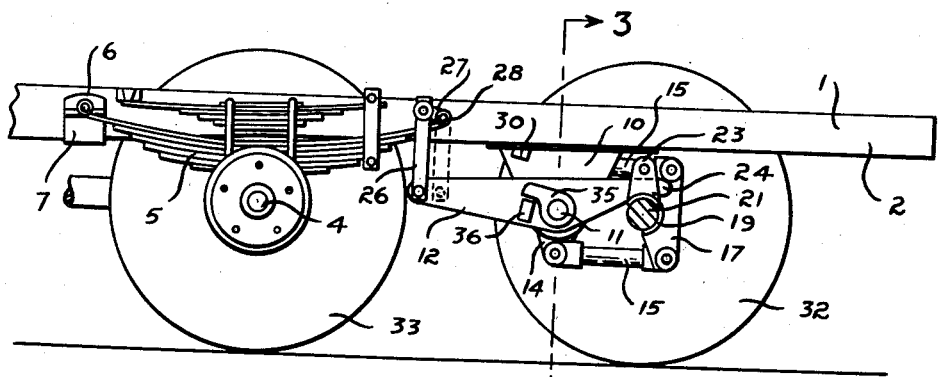
Figure 1 is a fractional view of a motor truck chassis having a conventional rear axle, with some of the road wheels removed and fitted with the invention.

The numeral 1 indicates generally a part of a truck chassis or frame having longitudinal members 2, transversely of which a rear driven axle 4 is mounted. The rear axle assembly is of the conventional type and is mounted on a pair of springs 5 in the usual way, with the front spring eye 6 of each spring mounted upon spring hangers 7 from the longitudinal members 2.

Secured to the underside of the longitudinal members 2 to the rear of the driven axle 4 is a bearing bracket 10 in which a shaft 11 is rockingly mounted. At the outer ends of said rock shaft a pair of walking beams 12 are freely journalled. Mounted on the inner side of each of the brackets 10 and formed integrally therewith, are stationary vertical arms 14 which are connected at their upper and lower extremities by torque rods 15 to movable links or torque rod arms 17. The arms 17 are provided on their forward edges with seats 19 which are welded to a trailing axle 21. The axle 21 is united to the torque rod arms to withstand the torque developed by the brakes, not shown, of the trailing wheels to be hereinafter referred to. The trailing axle 21 is provided adjacent each end with a fork 23 which engages the rear downwardly curved end 24 of a walking beam 12 to closely couple the axle to the walking beam.

The forward end of each walking beam 12 is suspended in a link 26 fitted to one end of a clevis 27, which clevis is connected to the rear eye 28 of the spring 5. The clevis 27 serves to dispose the weight of the load carried by the trailing axle directly over two or more leaves of said spring. A stop block 30 extends outwardly from each bearing bracket 10 which is adapted to limit the swing of the walking beams 12 in a clockwise motion.

A pair of trailing wheels 32, one only shown, are freely journalled upon the ends of the trailing axle 21 and a pair of driving wheels 33 are fitted upon the driven axle 4.

The rock shaft 11 is non-rotatably fitted at its outer ends with latch cranks 35 which are set to engage stops 36 secured on the forward part of the walking beams 12.

Figure 2:
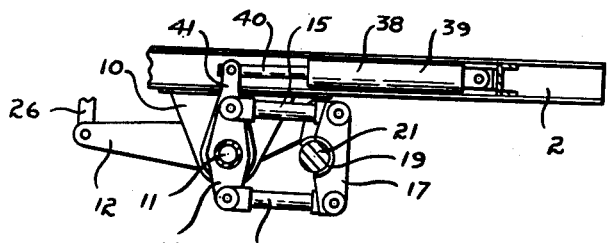
Fig. 2 is a longitudinal sectional view of the rear end of the right side of the truck chassis supporting one of the brackets of the trailing axle taken on the line 2—2 of Figure 3.

A single acting ram 38 having a cylinder 39 is mounted between the longitudinal members 2, see Figure 2. A piston 40 extends from the ram cylinder 39 and is connected at its outer end to an arm 41 secured upon the rock shaft 11. The ram 38 serves to rock the shaft 11 in a counter-clockwise direction so as to cause the latch cranks 35 to engage the stops 36 and rock the walking beams in an anti-clockwise direction when desired. The ram is actuated manually or otherwise from an oil pump, not shown, which pump is provided with means to hold its inlet and outlet valves open when not in use to permit the piston 40 to float freely in the cylinder 39 when the trailing axle is carrying its share of the load of the truck.

In use, with the truck fully loaded the device operates in substantially the position in which it is shown in Figures 1 and 2, the load being spring supported between the spring hangers 7 and the brackets 10. Any irregularity in rise and fall of the driving and trailing wheels is compensated for by movement of the inner end of the walking beams 12 and the rear end of the springs 5 which move in unison. If one or both driving wheels lose traction when the trailer wheels 32 are carrying a load, the operator uses the ram 38 to rock the rock shaft 11 and the latch cranks 35 until the cranks engage the stops 36 and commence to turn the walking beams 12 in an anti-clockwise direction. This rocking of the walking beams will relieve the load on the trailer wheels 32 and transmit it to the driving wheels 33. When the loading of the driving wheels is increased as above to a suitable extent, the traction between tires and road is restored, so that the pump may be put out of action to allow the ram piston 40 to return to floating position and the load to be carried proportionately by both driving and trailing axles.

Figure 4:
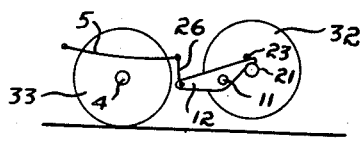
Figure 4 is a diagrammatic view of the invention showing the trailing axle and its wheels raised above ground contact.
Figure 3:
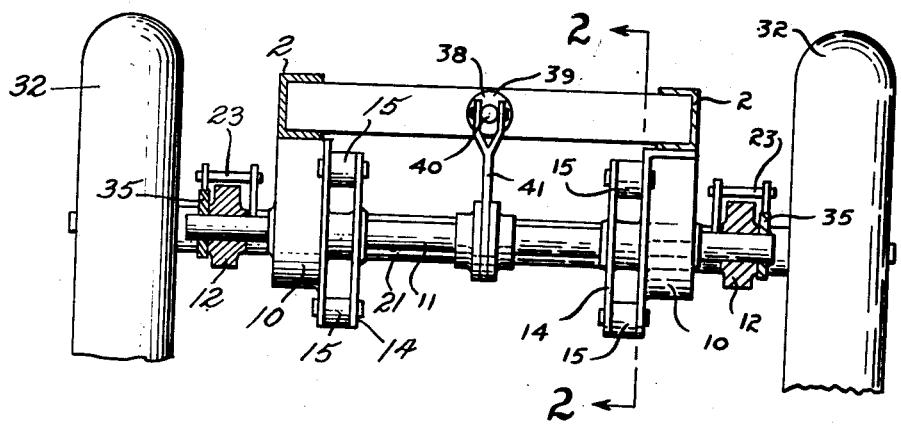
Figure 3 is an enlarged sectional view taken on the line 3—3 of Figure 1.

When the truck load has been delivered, so that the total truck load could be carried on the front wheels and driving wheels within the prescribed regulations, the pump is again operated until the rock shaft and the walking beams 12 have been swung to the position indicated in Figure 4 with the trailing wheels clear of road contact. Obviously pressure will need to be maintained upon the piston as long as it is desired to keep the trailing wheels off the ground, in which position subsequent wear and tear on one set of tires will be saved.

If when the load is being carried by both axles 4 and 11, the trailing wheels drop into an unduly deep depression, the swing of the walking beams 12 will be arrested by hitting the stop blocks 30, thus preventing the rear ends of the springs 5 from rising beyond a predetermined point on the side of the chassis.

What I claim as my invention is:

1. The combination of a truck chassis having longitudinal members, a driven rear axle and a driving wheel assembly including springs connecting the longitudinal chassis members to said driven axle, a transverse shaft rockingly mounted to the rear of the driven axle, a walking beam journalled upon each end of the rock shaft, a trailing axle having road wheels secured adjacent the rear ends of the walking beams, and a pair of torque rods pivotally mounted one above the other from each of the longitudinal members, a vertical member pivotally connecting the free end of each pair of torque rods, said trailing axle being connected to each of said vertical members, said walking beams being connected at their opposite ends to the springs, said rock shaft having a limited rotational movement in one direction within the walking beams, and a ram for rocking the rock shaft and also for rocking the walking beams in one direction after the relative rocking movement between the rock shaft and the walking beams has ceased.

2. The combination of a truck chassis having longitudinal members, a driven rear axle and a driving wheel assembly including side springs connecting the longitudinal chassis members to said driven axle, a transverse shaft rockingly mounted to the rear of the driven axle from the chassis, a walking beam journalled upon each end of the shaft, a pair of torque rods swingingly mounted one above the other from each of the longitudinal members, a vertical member swingingly mounted between the free ends of each pair of torque rods, a trailing axle having road wheels secured adjacent the ends of the walking beams and to the vertical members, said walking beams being connected at their opposite ends to the rear axle springs, said walking beams each having a stop, and a latch crank secured to opposite ends of the transverse rock shaft adapted to engage the said stops and impart rocking movement to the walking beams as said rock shaft is moved in one direction beyond a predetermined point.

HARRY EDWARD WILLOCK.

References Cited in the file of this patent

UNITED STATES PATENTS

| Number | Name | Date |
| --- | --- | --- |
| 1,940,914 | Marcum | Dec. 26, 1933 |
| 1,981,593 | Fageol | Nov. 20, 1934 |
| 1,989,745 | Farris | Feb. 5, 1935 |
| 2,096,530 | Alden | Oct. 19, 1937 |
| 2,391,948 | Couse | Jan. 1, 1946 |